(No Model.) 9 Sheets—Sheet 1.

C. F. ELLIOTT.
VENTILATING APPARATUS AND CHIMNEY TOP.

No. 465,756. Patented Dec. 22, 1891.

Witnesses
J. A. Rutherford
J. H. Daly

Inventor.
Charles F. Elliott
By James L. Norris.
Attorney.

(No Model.)  9 Sheets—Sheet 4.

C. F. ELLIOTT.
VENTILATING APPARATUS AND CHIMNEY TOP.

No. 465,756. Patented Dec. 22, 1891.

(No Model.) 9 Sheets—Sheet 5.
C. F. ELLIOTT.
VENTILATING APPARATUS AND CHIMNEY TOP.
No. 465,756. Patented Dec. 22, 1891.

Witnesses
J. A. Rutherford
Robert Emmett

Inventor
Charles F. Elliott.
By James L. Norris.
Attorney (No Model.) 9 Sheets—Sheet 6.

C. F. ELLIOTT.
VENTILATING APPARATUS AND CHIMNEY TOP.

No. 465,756. Patented Dec. 22, 1891.

Witnesses.
J. A. Rutherford.
J. H. Daly

Inventor.
Charles F. Elliott
By James L. Norris.
Attorney.

(No Model.)   9 Sheets—Sheet 7.
C. F. ELLIOTT.
VENTILATING APPARATUS AND CHIMNEY TOP.
No. 465,756.   Patented Dec. 22, 1891.

(No Model.) 9 Sheets—Sheet 8.

C. F. ELLIOTT.
VENTILATING APPARATUS AND CHIMNEY TOP.

No. 465,756. Patented Dec. 22, 1891.

Witnesses.
J. A. Rutherford.
J. H. Daly.

Inventor.
Charles F. Elliott
By James L. Norris.
Attorney (No Model.)  9 Sheets—Sheet 9.

C. F. ELLIOTT.
VENTILATING APPARATUS AND CHIMNEY TOP.

No. 465,756. Patented Dec. 22, 1891.

Witnesses.
J. A. Rutherford.
J. H. Daly.

Inventor.
Charles F. Elliott.
By James L. Norris.
Attorney.

UNITED STATES PATENT OFFICE.

CHARLES FREDRICK ELLIOTT, OF WAVERTREE, NEAR LIVERPOOL, ENGLAND.

VENTILATING APPARATUS AND CHIMNEY-TOP.

SPECIFICATION forming part of Letters Patent No. 465,756, dated December 22, 1891.

Application filed April 13, 1891. Serial No. 388,803. (No model.)

*To all whom it may concern:*

Be it known that I, CHARLES FREDRICK ELLIOTT, a subject of the Queen of Great Britain and Ireland, residing at Wavertree, near Liverpool, England, have invented certain new and useful Improvements in Ventilating Apparatus and Chimney-Tops; and I do hereby declare that the following is a full, clear, and exact description of the invention, which will enable others skilled in the art to which it appertains to make and use the same.

This invention has reference to apparatus employed for the removal or exhaustion of gases or vapors or vitiated or partly vitiated atmosphere from inclosed spaces—such as rooms of dwelling-houses, ships' holds, warehouses, and the like—and for carrying off or exhausting from chimney-shafts smoke or other gases—that is to say, the invention is alike applicable as a ventilator proper or as a chimney-cowl.

Apparatus constructed according to this invention consists of a tube or tubes having at each end a mouth adapted to collect air moved by wind force and to cause it to pass through the apparatus, an aperture or apertures in the center or about the center of the tube or tubes connected directly or indirectly by means of a vacuum-chamber to the space to be ventilated or from which gas or vapor is to be withdrawn, and inwardly-projecting partial diaphragms or shields to said aperture or apertures in the tube or tubes and springing inward from the point at which the inlet aperture or apertures is or are disposed in said tube.

The above-specified partial diaphragms or shields may consist of simple plates or wedge-shaped plates, or a tube projecting inward, or any analogous device.

In cases in which it is desired to prevent the entrance of water into the upcast shaft or its equivalent the inlet aperture or apertures for the gas to be removed is or are disposed upward or at the sides, so that water entering either mouth of the apparatus is prevented from flowing into such shaft.

In an apparatus constructed as described, having two or more mouths, it will be plain that no matter what direction the wind may blow in the apparatus it will be operative and without the use of any moving parts. At the same time it is to be understood that my invention may be adapted to be arranged as a rotary apparatus having one air-collecting mouth; also, the apparatus, by the use of a valve or valves, may be adapted to be used as a downcast or upcast shaft, as desired.

The invention is applicable for ventilating all kinds of inclosed spaces of buildings or structures and ships' holds and cabins, railway-carriages, and other chambers, and also as a chimney-cowl, and it may be placed vertically, upon its side, or in any other suitable position.

The examples of ventilating apparatus shown in the drawings show my invention carried out in several different ways or modifications.

In all the figures of the drawings the same or equivalent parts of the different apparatus are designated by the same letters of reference used in the following description.

Referring now to the drawings, $a$ is the tube of the apparatus through which the air passes.

$b$ are bell or trumpet shaped air-collecting mouths.

$c$ designates the aperture through which the air or gases pass from the space or chamber to be ventilated to the tube $a$.

$d$ are partial diaphragms or shields disposed on either side of the apertures $c$ across the tube $a$ and by which the extraction of air or gases is effected.

$e$ is the tube or conduit which communicates between the ventilator and the space to be ventilated, and $f$ is a hood or chamber arranged over or round the aperture $c$ and herein termed the "vacuum-chamber."

It will be seen that in all the figures of the drawings the partial diaphragms or shields hang from the upper part of the tube $a$ and that the aperture $c$ is in the top part of the tube. This disposition of these parts is not in all cases essential, but in the majority is used, since by so arranging them the water, seas, rain, snow, or other moisture which may be carried through the tube is at all times prevented from gaining access to the interior of the apparatus. In cases, however, where the apparatus is adapted to serve as a downcast this aperture, with its shields or partial diaphragms, may be disposed on the lower side of the tube. At the same time, even in such an application of the invention, they may with practically the same effect be arranged at the upper side; but to render the one or other available at will the tube $a$ may be adapted to be turned about its axis within the chamber $f$. When so made, in the case of its being used as a chimney-cowl, the tube may be turned so that the aperture $c$ is at the bottom, thereby allowing the aperture to be brushed from below. The area of one side of the shields $d$ is in the example shown in the drawings about one-third ($\frac{1}{3}$) the area of the tube $a$. This proportion is not essentially a fixed one, but is one which can be used with advantage; also, the shape or form of such diaphragms shown in the drawings may be varied without changing the nature of the effect produced; but the form shown in the figures is a simple, cheap, and useful one.

Of course it will be understood the apparatus may be made of any suitable material, such as metal, wood, terra-cotta, glass, earthenware, &c.

The action of the apparatus is that, in the case of the fixed ventilator, the wind forcing the air through the tube $a$, one or more of the partial diaphragms or shields $d$, as the case may be, so act upon it that they not only prevent any entrance of the air into the chamber $f$, but cause a considerable rarefaction of air within the space behind them and the chamber $f$ and a consequent vigorous extraction of air or gases from the space being ventilated. The air so extracted, together with that employed for its extraction, is discharged by that one of the mouths $b$ for the time being away from the direction of the wind.

Figure 1:
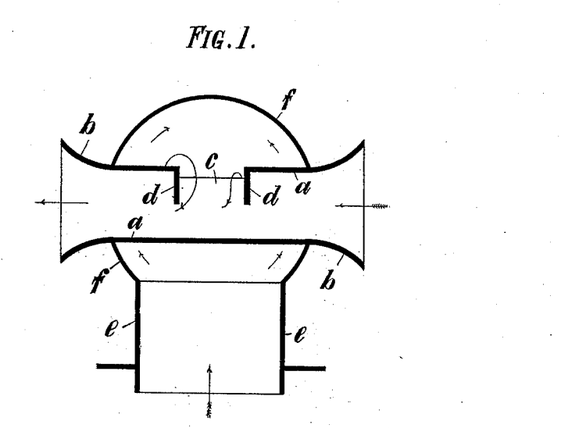
Figs. 1, 2, and 3 show, respectively, in sectional elevation, sectional end view, and sectional plan a simple double-mouthed ventilator according to the invention.
Figure 2:
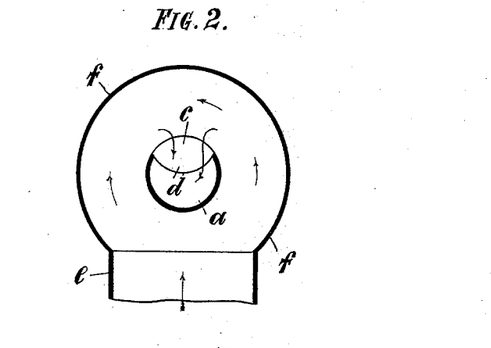
Figure 3:
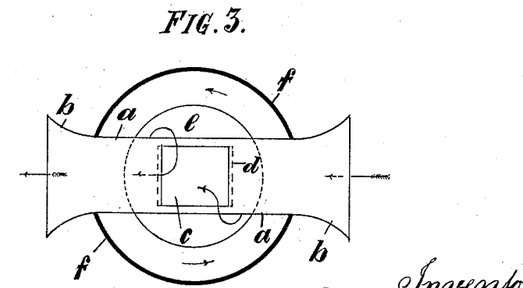
Figure 4:
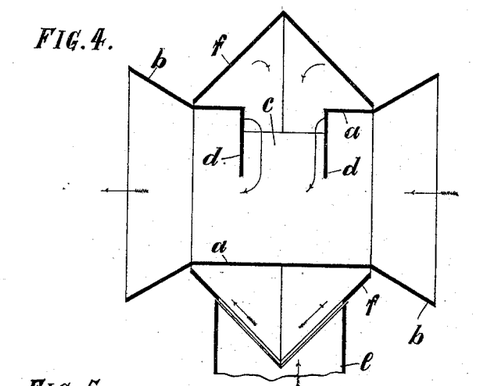
Figs. 4, 5, and 6, which are respectively sectional elevation, sectional end view, and sectional plan, show the same kind of apparatus in a slightly-modified shape.
Figure 5:
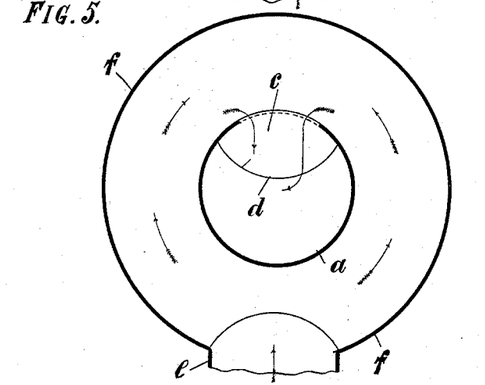
Figure 6:
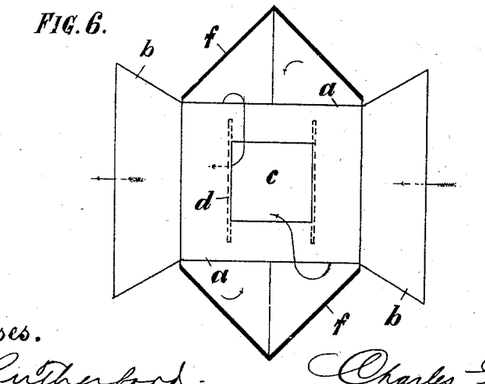
Figure 9:
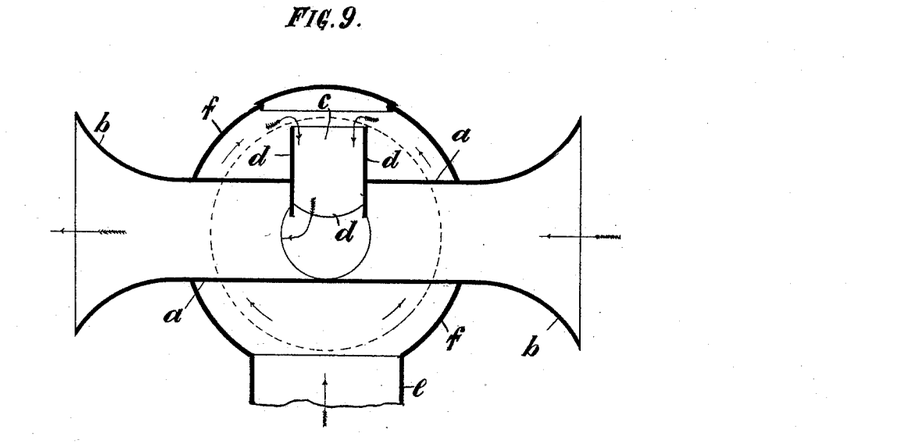
Figs. 9 and 10 are respectively sectional elevation and sectional plan of a quadruple-mouthed apparatus of the type shown in Figs. 1 to 3.
Figure 10:
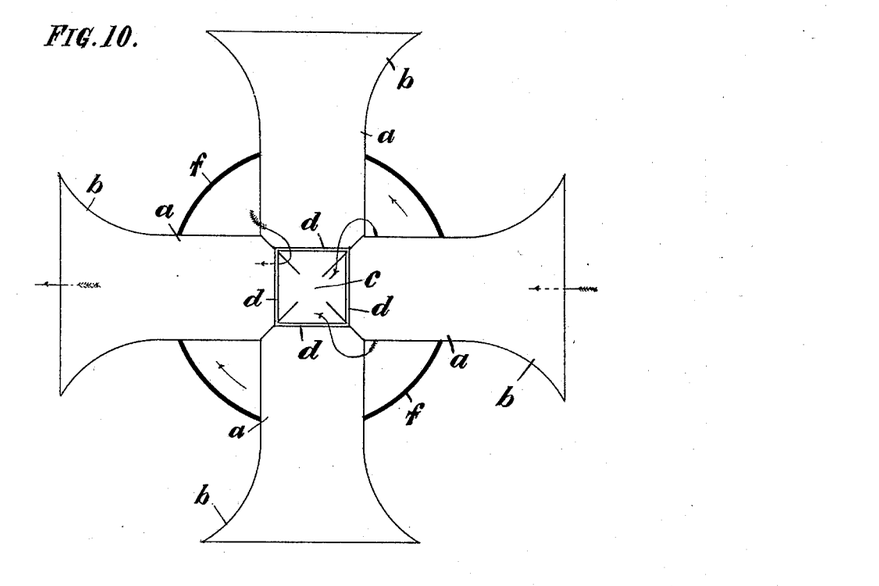

Regarding Figs. 4 to 6, the apparatus shown herein is practically the same as that shown in Figs. 1 to 3, but is of a slightly cheaper construction when made of zinc, galvanized iron or steel, or like metal, and Figs. 9 and 10 are practically the use of the tube of Fig. 1 in duplex form, crossing each other at right angles and in the same plane. In this latter apparatus it will be obvious that from whatever direction the wind blows, one or more, as the case may be, of the mouths $b$ must collect air; but at the same time, even if the apparatus be provided with only two mouths, as in Figs. 1 to 6, an extracting effect is still obtained by the apparatus when the direction of the wind is at right angles or approximately at right angles to the axis of the tube $a$; but of course the action is not so intense as when blowing directly into one of the mouths. The form of apparatus, therefore, shown in Figs. 1 to 6 is more suitable for application to the ventilation of moving structures—such as railway carriages and vans, ships, tramway-cars, and other covered vehicles—as in such cases the action of the apparatus is mostly due to the movement of the structure through the air, its tube $a$ being set in line therewith. Thus a passage of air through it is assured whenever the structure moves.

Figure 7:
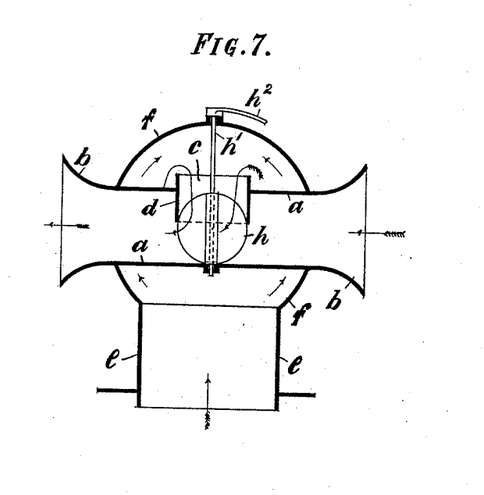
Figs. 7 and 8 are sectional elevation and plan of the apparatus shown in Figs. 1 to 3 provided with a controlling-valve.
Figure 8:
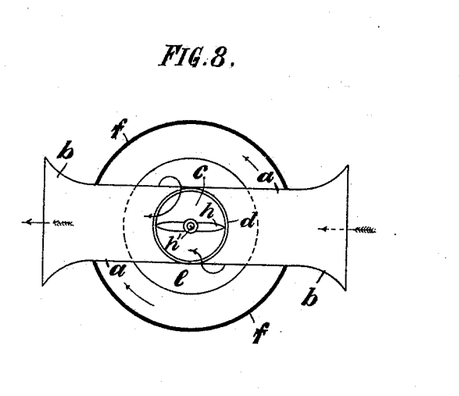

With reference to Figs. 7 and 8, the apparatus is shown provided with a disk-valve $h$, mounted upon the spindle $h'$ and having an actuating-handle $h^2$. When this valve is set in the position shown in the figures, the apparatus acts as an upcast or extracting apparatus; but when it is turned so that it lies in a plane at right angles to the axis of the tube $a$ and fills or nearly fills such tube the apparatus acts as a downcast ventilator. On board ship and analogous cases where it is desired to deliver large volumes of air into holds or spaces, such apparatus as this may be used, one or more of them being used as a downcast, while the others are acting as extracting ventilators.

Figure 11:
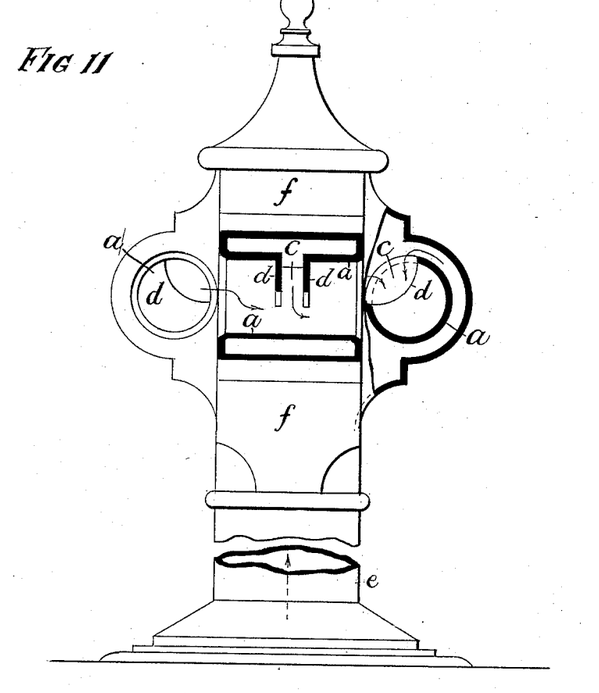
Figs. 11 and 12 are respectively part sectional elevation and outside plan of an apparatus having quadruple ventilating-tubes, each of a duplex-mouthed type.
Figure 12:
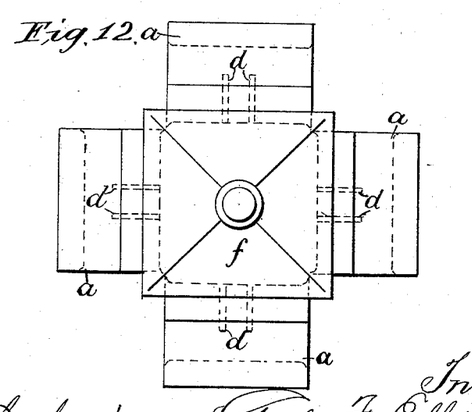

The apparatus shown in Figs. 11 and 12 has four ventilating-tubes $a$, open at both ends and arranged round a central vacuum-chamber $f$. This apparatus shows one modified form which the invention may take when applied for the purpose of extracting large volumes of air, or, in cases where it is desired, it should be of an ornamental design when applied to buildings, or both.

Figure 13:
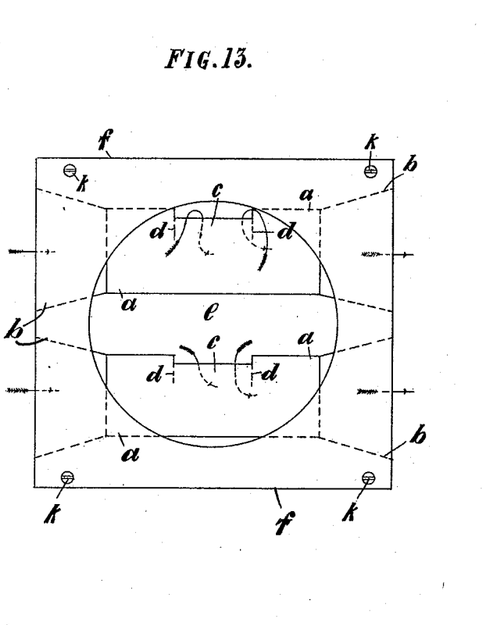
Figs. 13 and 14 are outside elevation and inside side elevation of a duplex arrangement particularly adapted to fit on walls or surfaces standing in the vertical plane and to form a compact arrangement for such cases.
Figure 14:
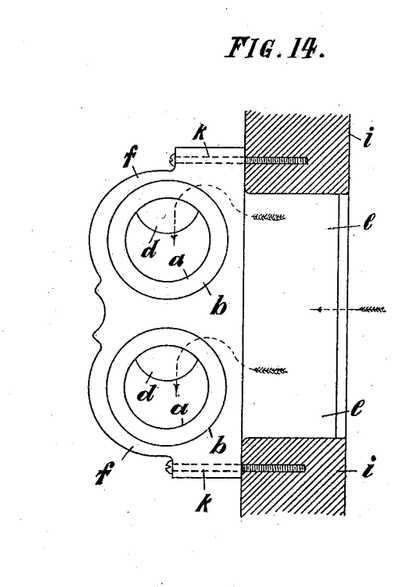

The arrangement of apparatus shown in Figs. 13 and 14, as previously stated, is designed more especially for application to vertical surfaces and to protrude therefrom as little as possible. It consists, as will be seen, of practically a rectangular chest $f$, which serves as the vacuum-chamber, through which the tubes $a$ pass, bell-mouths $b$ being provided at each end of the tubes, as shown. The inlet-conduit $e$ of the chamber $f$ is adapted to fit into a corresponding aperture in the side wall $i$, onto which it is fixed, such fixing being effected by screws or bolts $k$. This kind of apparatus is especially useful for ventilating ships, deck-houses, cabins, state-rooms, railway-carriages, and other moving structures. At the same time it is also suitable for ventilating-spaces where such ventilation is to be effected through a vertical wall—as, for instance, as ventilators applied to the outsides of houses or other walls—in which case it may be very conveniently secured to an ordinary ventilating brick or block.

Figure 15:
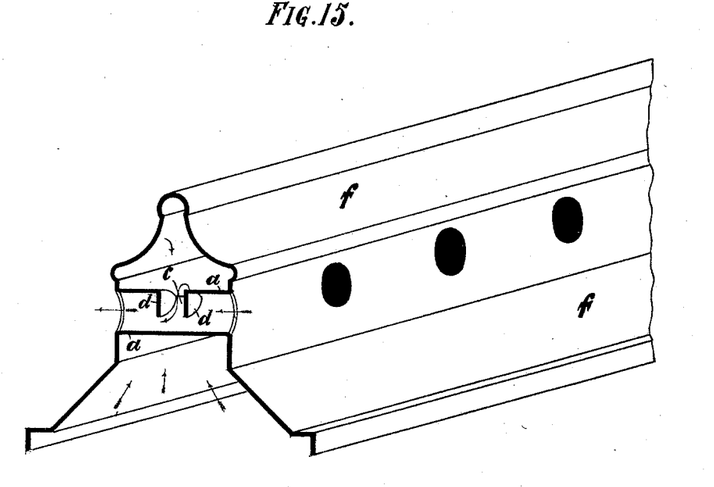
Fig. 15 shows the invention applied as a ridge-piece for a building or structure.

The ridge-ventilator, (shown in Fig. 15,) it will be obvious, can be applied to all cases where it is desired to ventilate a building through a roof. In this case it will be seen the tubes $a$ are connected to the sides of the ridge-piece $f$, which serves as the vacuum-chamber.

Figure 16:
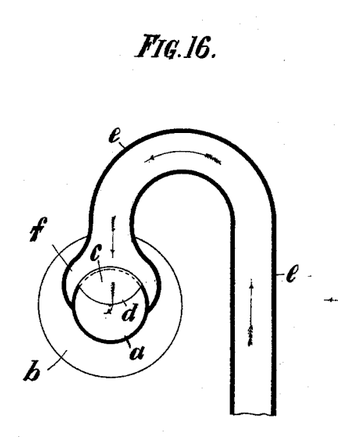
Figs. 16 and 17 show the invention in a modified form.
Figure 17:
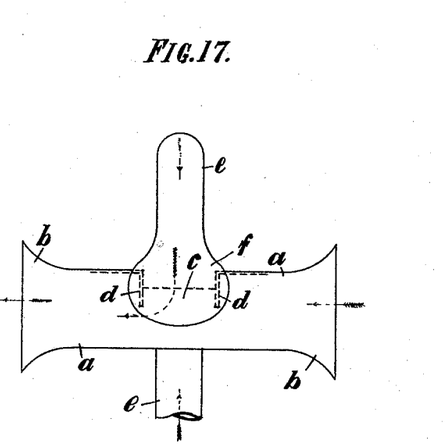

In the modification shown in Figs. 16 and 17 the tube $a$ is supported by the end of the goose-necked conduit $e$, which end covers the aperture $c$ and is slightly swelled to form a chamber $f$ about such aperture.

Figure 18:
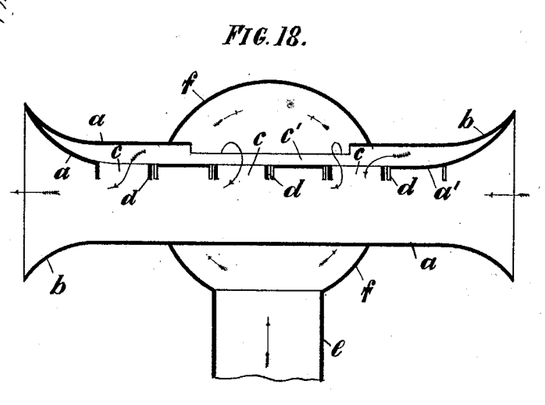
Fig. 18 is a sectional elevation.
Figure 19:
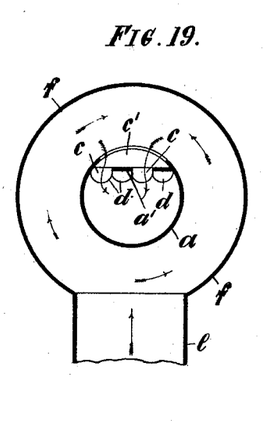
Fig. 19 is a cross-section, and Fig. 20 a plan in section, of another modification.
Figure 20:
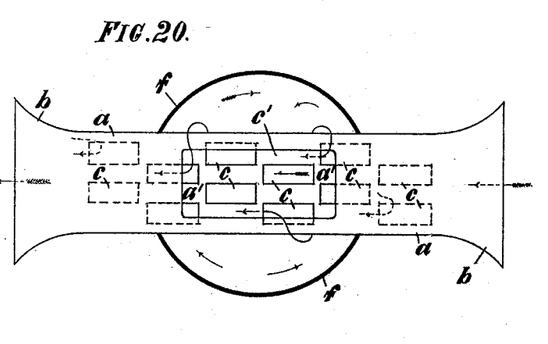

In the modification shown in Figs. 18, 19, and 20 a plurality of apertures $c$, provided at each end with shields $d$, are formed within the tube $a$ in lieu of one only, as in the other cases specified with reference to the drawings. The apertures and shields are provided in a plate $a'$, connected with the interior of the tube $a$, and the connection between such apertures and the interior of the chamber $f$ is afforded by an aperture $c'$ in the tube $a$. One advantage attending the use of this construction of apparatus is that it prevents birds getting into it and blocking it up by building their nests in it, the apertures $c$ of course being too small to let them through.

Figure 21:
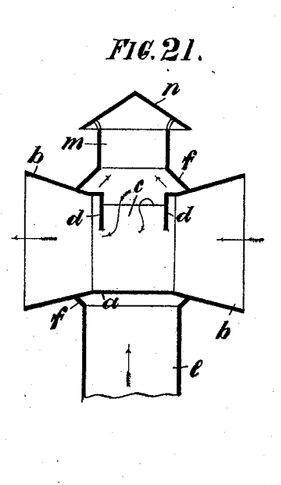
Fig. 21 is a sectional elevation of a further modification, of the invention.

In Fig. 21 I show a modification wherein the top of the chamber $f$ of the apparatus is open at $m$, such opening having a cover $n$. By this construction the apparatus works more effectively at times of the existence of little or no wind. This cover may also be adapted to lift off, so that access may be had to the interior of the apparatus for cleaning or other purposes when desired. The main cause of this type acting better under the circumstances mentioned is that the air or gases passing through the apparatus will not not have so circuitous a course to travel.

Figure 22:
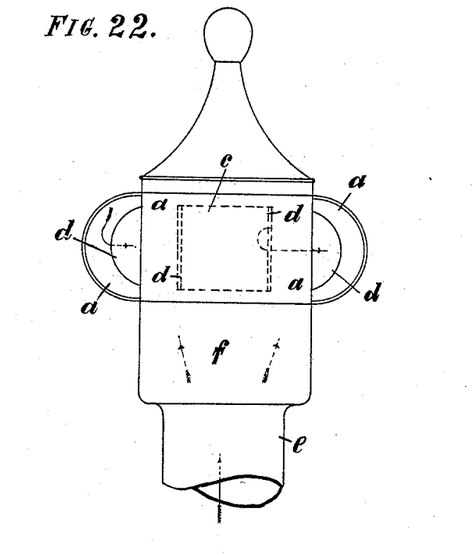
Fig. 22 is an outside elevation, and Fig. 23 a plan, of a further modification and of the type shown in Figs. 11 and 12.
Figure 23:
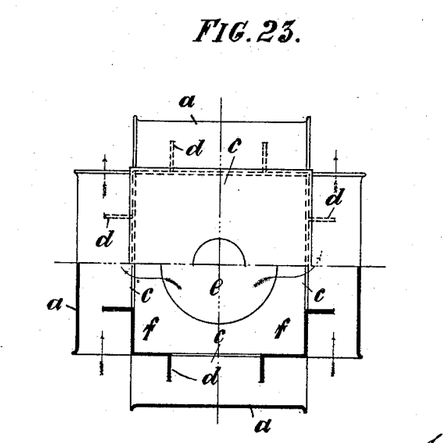

In Figs. 22 and 23 the apparatus has a central vacuum-chamber $f$ and four ventilating tubes or conduits $a$, open at both ends, disposed upon the four sides of the chamber, each tube or conduit having partial diaphragms or shields $d$ standing out from the wall of the chamber $f$ and disposed one at each end of the aperture $c$ therein.

It will be plain that apparatus of the type shown in Figs. 1 to 6, 9 to 10, 11 to 12, and 16 to 21 are all applicable as chimney-cowls, as well as for ordinary ventilating purposes, and in the case of chimney-cowls it will also be plain that the invention may be carried out in various ways to suit special requirements.

I wish to state in conclusion that the invention may be carried out in various ways, as exemplified by the drawings, and that the apparatus shown in these drawings sets forth only so many examples or modifications of the invention; also, the form or construction of the partial diaphragms or shields $d$ and the tubes $a$ may be modified in various ways without departing from the invention.

What I claim in respect of the herein-described invention is—

A ventilating apparatus or cowl combining in its structure the tube $a$, the orifice $c$, disposed in the tube, whereby water entering said tube is prevented from falling into and through said orifice, the vacuum-chamber $f$, extending over the orifice in the tube and having means to communicate with the space to be ventilated and by which intermittent stoppages of updraft of air or gases are prevented, and partial diaphragms or shields $d$, extending into the tube $a$ from opposite edge portions of the orifice thereof, substantially as and for the purposes described.

In testimony whereof I hereunto affix my signature in presence of two witnesses.

CHARLES FREDRICK ELLIOTT.

Witnesses:
FREDERICK JOHN CHEESBROUGH,
JAMES ANDREW CONBROUGH,
  Both of 15 Water Street, Liverpool.